Figure 1:
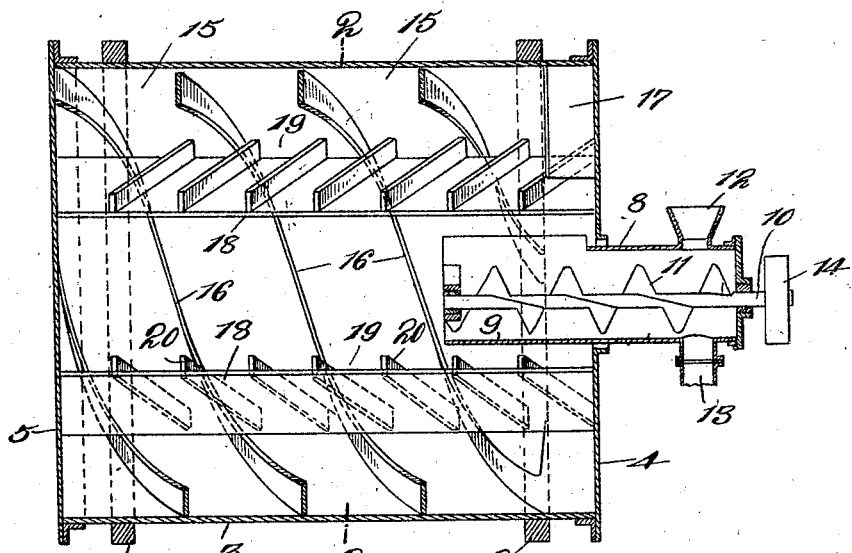

R. TIEDTKE.
MIXING MACHINE.
APPLICATION FILED OCT. 27, 1910.

1,139,085.

Patented May 11, 1915.

UNITED STATES PATENT OFFICE.

RICHARD TIEDTKE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

MIXING-MACHINE.

1,139,085.  Specification of Letters Patent.  Patented May 11, 1915.

Original application filed March 30, 1908, Serial No. 424,015. Divided and this application filed October 27, 1910. Serial No. 589,440.

*To all whom it may concern:*

Be it known that I, RICHARD TIEDTKE, engineer, citizen of the Empire of Germany, residing at Höchst-on-the-Main, Germany, have invented certain new and useful Improvements in Mixing-Machines, of which the following is a specification.

This invention relates to improvements in mixing machines and has for an object to provide a mixer capable of intimately mixing the component parts of the mass under treatment by causing a diversity of movements of various portions of the mass.

This application is a division of my application for patent Serial No. 424,015 filed in the United States Patent Office March 30th, 1908, for mixing machines.

This present improvement is adapted for use in mixing materials of various kinds where an intimate admixture of the component parts of the mass is essential, and is particularly adapted for use in the mixing of dry-colors, and in effecting an intimate mixture of powdered substances without causing dust.

The container, preferably a drum, will be rotated for effecting the mixture of the mass within it and after the mixing has been accomplished the contents will be discharged without changing the direction of rotation of the container.

The invention also relates to a feeding device, which will feed material either from a supply hopper into the drum, or from the drum to a discharge spout during the rotation of the drum.

In the drawings accompanying and forming a part of this specification a practicable form of my invention is illustrated and wherein—

Figure 2:
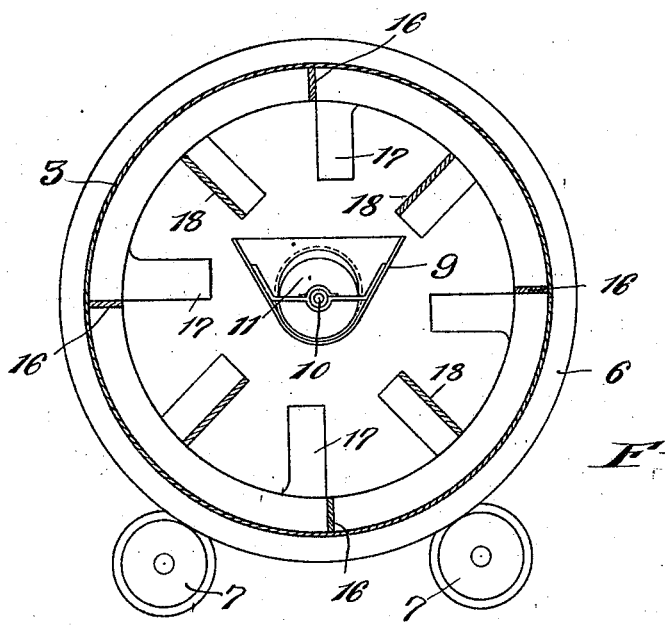

Figure 1 is a longitudinal section of the device and Fig. 2 is a cross-section thereof, taken on a plane at about the line 2—2 of Fig. 1 looking from the right in said figure.

The container is illustrated as a cylindrical drum 3 which is provided with ends or heads 4, 5, respectively. The drum is shown provided with trackers in the form of bands 6—6 which will run upon wheels 7—7, one or more of which wheels will be rotated in some convenient manner for imparting rotation to the drum. The head 4 of the drum is provided with a central opening through which projects a feeding and discharging device, the portion 8 thereof, which is outside of the drum being preferably cylindrical, and the portion which is within the drum being shown in the form of an open ended hopper 9. A shaft 10 mounted in suitable bearings traverses the feeding and discharging device comprised by the body portion 8, and hopper 9. The shaft 10 is provided with a worm 11, operating within the body portion and the hopper. The body portion 8 is provided at its upper portion with a feed hopper 12, and at its lower portion with a discharge spout 13. A pulley 14, is shown mounted upon the shaft 10 whereby the shaft may be rotated by means of a suitable belt which may be driven in reverse directions for feeding or discharging as occasion may demand. It will be noted that if the shaft is rotated in one direction the screw will cause material supplied to the hopper 12 to pass out of the inner or open end of the hopper 9, depositing this at a considerable distance inwardly of the head 4 which is at the receiving and discharging end of the drum, and that if the shaft is rotated in the opposite direction material which is deposited in the hopper 9 will be moved to such a position that it will readily discharge from the spout 13.

The inner surface of the drum is provided with a series of helical channels 15, such channels in the present illustration being the spaces between a series of helical blades which are designated by reference character 16. Four of these blades are shown in the present instance each of which extends from end to end of the drum and makes a complete convolution. Each of the channels 15 ends in a discharging chute 17, which chutes are disposed upon the end 4 of the drum and are directed inwardly and in such position that upon the rotation of the drum in a direction from left to right, in Fig. 2, material carried forward to the end 4 by the channels 15, will by such chutes be deposited in the hopper 9, and if the screw 11, in the hopper is moving in a direction from left to right in Fig. 2, namely the direction which will feed materials supplied at hopper 12 into the drum, such materials will be returned to the mass of material within the drum for further treatment. If however, the feed screw 11 is revolving in the reverse direction, namely from right to left in Fig. 2, material deposited by the chutes 17 into the hopper 9 will be by said screw moved to the discharge spout 13 and discharged.

A series of lifting plates 18, are mounted within the drum and extend from end to end thereof and are mounted inwardly of the channels 15, in a direction radially of the drum. This brings the lifting plates contiguous to the helical channels. In the present illustration the outer edges of the lifting plates 18 engage the inner edges of the blades 16. In the present illustration the lifting plates are shown disposed substantially radially of the axis of rotation of the drum.

When the drum is being rotated the helical channels 15 tend to move a portion of the material toward the receiving and discharging end 4 of the drum, and the lifting plates 18 tend to move another portion of the material, a portion which is disposed inwardly of that lying in the channels 15, in an orbital path, transversely of the direction of movement of the material acted upon by the channels, which channels of course tend to move material in a direction parallel with the axis of drum rotation.

Each of the lifting plates 18, is provided with a series of channels 19, upon that side which is the upper side of the plate when it is ascending in the working of the machine. The channels 19 are formed in the present illustration by a series of blades 20. Such channels are disposed in a direction substantially opposite to the direction of the channels 15, that is, the channels 15 are at their working zone directed toward the receiving and discharging end 4 of the drum, which might be called the front end, and the channels 19 are directed toward the opposite or back end of the drum. This opposite disposition of channels is for the purpose of intimately and rapidly mixing the mass of material under treatment.

By use of this present improvement the component parts of the material under treatment are intimately and quickly mixed by setting up within such mass a number of currents moving in miscellaneous paths, one crossing another and in causing the material tending to move along the respective paths to be repeatedly diverted into other paths of movement.

In order to arrive at an understanding of the interrelation of the various paths or currents of movement and their interconnection in effecting a complete admixture of the components of the mass of material under treatment the folowing analysis may be of assistance: The helical channels 15 act upon the outer or drumward portion of the material and tend to move a body of such material, or rather a series of bodies of such material, toward the front end of the drum. This movement will be in a path substantially parallel with the axis of drum rotation. Each of the lifting plates will in turn act upon the portion of the material disposed inwardly of that acted upon by the helical channels, and tend to carry a body of such material in an orbital path about the axis of drum rotation. This path for working purposes may be regarded as tending upwardly and transversely of the path of movement of the longitudinally moving bodies of material. A part of this upwardly moving material will spill inwardly off of the lifting plate, and fall upon the drum in the helical channels and in front of the bodies of material then in such channels. These second bodies of material deposited in the helical channels will, upon the continued rotation of the drum, impede the normal advance of the first bodies of material in such channels resting upon the drum and cause the same to be dumped on top of the second bodies of material deposited on the drum in the helical channels, and such first bodies of material to assume a position inwardly of the drum and in the path of movement of the lifting plates. Upon the movement of the first bodies of material out of the helical channels and away from the drum the material on the lifting plate which is then active will be permitted to discharge outwardly, that is, toward the drum, as well as inwardly and thus spread a third body of material upon the second position of the first bodies. The channels 19 on the lifting plates being disposed in a direction opposite to the direction of the helical channels will cause the material which is spilled inwardly to move toward the back end of the drum and that which is spilled outwardly to move toward the front end of the drum. This tends to scatter the body of material held in each channel 19 of the lifting plate and to cause some of it to commingle with the body of material from one channel 15 and some of it to commingle with the body of material from another channel 15.

The foregoing is an analysis of the tendency of each portion of the apparatus separately considered to transfer a moving body of material into a divergent path of movement. In the real action of the apparatus as a whole, however, each of the tendencies of action of each of the parts is modified by the tendency of action of each of the other parts, and a complete admixture of the component parts of the mass of material under treatment is quickly effected by the counter currents set up throughout the entire mass.

While material is being mixed the feed screw 11 will be revolving in such a direction that the material fed into the hopper 9, by the chutes 17 will be thrown back toward the central portion of the drum. After the mixture has been completed the drum will be permitted to continue to rotate as before and the feed screw 11 will be rotated in a reverse direction so that the material fed into the hopper 9 from the chutes 17 will be passed to the discharge spout 13.

Although but one form of embodiment of my invention is illustrated herein it will be perfectly obvious that changes in detail of construction may be made without departing from the spirit of my invention.

Having thus described my invention what I desire to secure by Letters Patent is:

1. The combination with a rotatable drum, of a series of helically disposed blades disposed upon drum, chutes disposed upon the front head of the drum and associated with the respective helical blades, said chutes being directed inwardly, a centrally disposed hopper mounted within the drum and located in position for receiving material discharged by said chutes upon the rotation of the drum, and means located within said hopper for moving material therein backwardly into the drum for further treatment or outwardly for discharging the same.

2. In a device of the character described, a revolving, horizontal drum, means for moving the material continuously in a circuit therein and tumbling same, comprising peripherally disposed helical guides extending from end to end of said drum, longitudinal, radially-arranged lifting plates lying within said guides, guiding plates disposed obliquely on the lifting surface of said lifting plates, a discharge spout, and pockets at the ends of said helical guides for feeding the material to said spout, substantially as described.

3. The combination with a revolving horizontal drum, having means for moving the material continuously in a circuit therein and tumbling same, of feeding and discharge means communicating with the interior of said drum, said means comprising a shaft and a worm mounted on said shaft, said shaft being rotatable in one direction to operate said worm to effect the discharge of the material from said drum, and in the reverse direction to produce the return of the material to said drum for further mixing.

4. In a device of the character described, a revolving horizontal drum, having a receiving end, means for moving the material continuously in a circuit therein and tumbling same, the path of movement of the material being toward the receiving end of said drum, and means located in the receiving end of the drum and independent of the movement thereof for effecting the feeding and discharge of the material, said means embodying a worm and a discharge outlet, the worm being adapted to operate in one direction to effect the discharge of the material from said outlet and in the opposite direction to return the material to the drum for mixing.

5. In a device of the character described, the combination with a revolving horizontal drum, having one end provided for the reception of material, of means for moving the material continuously in a circuit therein and tumbling same, means for directing the path of movement of the material toward the reception end of said drum, and means located within said reception end and independent of the movement of said drum for feeding and discharging the material being operated upon, said means embodying a worm rotatable in one direction to effect the discharge of the material and in the reverse direction to return the material to said drum for further mixing, and a discharge chute located in said discharge and feeding means exteriorly of the reception end of said drum.

6. In combination with a revolving horizontal drum, having one end formed for the reception of material, means for moving the material continuously in a circuit therein and tumbling same, means for directing the path of movement of material toward the reception end and means located in the reception end of said drum, and independent of the movement of said drum, and embodying mechanism operable in one direction to discharge the material from said drum and in a reverse direction to feed the material back into said drum for inter-mixing with the bulk of material therein.

In witness whereof I have hereunto set my hand in the presence of two subscribing witnesses.

RICHARD TIEDTKE.

Witnesses:
JEAN GRUND,
CARL GRUND.